US008123602B2

(12) United States Patent
Ito et al.

(10) Patent No.: US 8,123,602 B2
(45) Date of Patent: Feb. 28, 2012

(54) GAME DEVICE AND PROGRAM

(75) Inventors: Masaaki Ito, Tokyo (JP); Shinichi Ogasawara, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 401 days.

(21) Appl. No.: 12/382,847

(22) Filed: Mar. 25, 2009

(65) Prior Publication Data
US 2009/0247251 A1 Oct. 1, 2009

(30) Foreign Application Priority Data
Mar. 28, 2008 (JP) .................................. 2008-85216

(51) Int. Cl.
*A63F 9/24* (2006.01)
(52) U.S. Cl. .............................................. 463/7; 463/9
(58) Field of Classification Search ................ 463/7, 32, 463/37, 43
See application file for complete search history.

(56) References Cited

U.S. PATENT DOCUMENTS
2008/0070655 A1* 3/2008 Tanabe ............................ 463/7
2008/0070684 A1* 3/2008 Haigh-Hutchinson ......... 463/32
2008/0268956 A1* 10/2008 Suzuki ............................ 463/37

* cited by examiner

*Primary Examiner* — Brook Kebede
(74) *Attorney, Agent, or Firm* — Wenderoth, Lind & Ponack, L.L.P.

(57) ABSTRACT

A game device for performing a game such that, when a first-choice display object is freely chosen via a pointing operation performed by a player from among a large number of display objects, a second-choice object is then required to be determined as a correct choice. The game device includes a determining means determining whether or not the display object of interest has been chosen based on position coordinates input from an input means and a choice determination range. The game device also includes a correcting means performing, when the correct second-choice object has been determined, correction processing for changing the size of a choice determination range for a display object of interest used for the determination processing so that the choice determination range for a correct choice display object becomes relatively larger than the choice determination range for an incorrect choice display object.

11 Claims, 8 Drawing Sheets

GAME DEVICE AND PROGRAM

TECHNICAL FIELD

Figure 1:
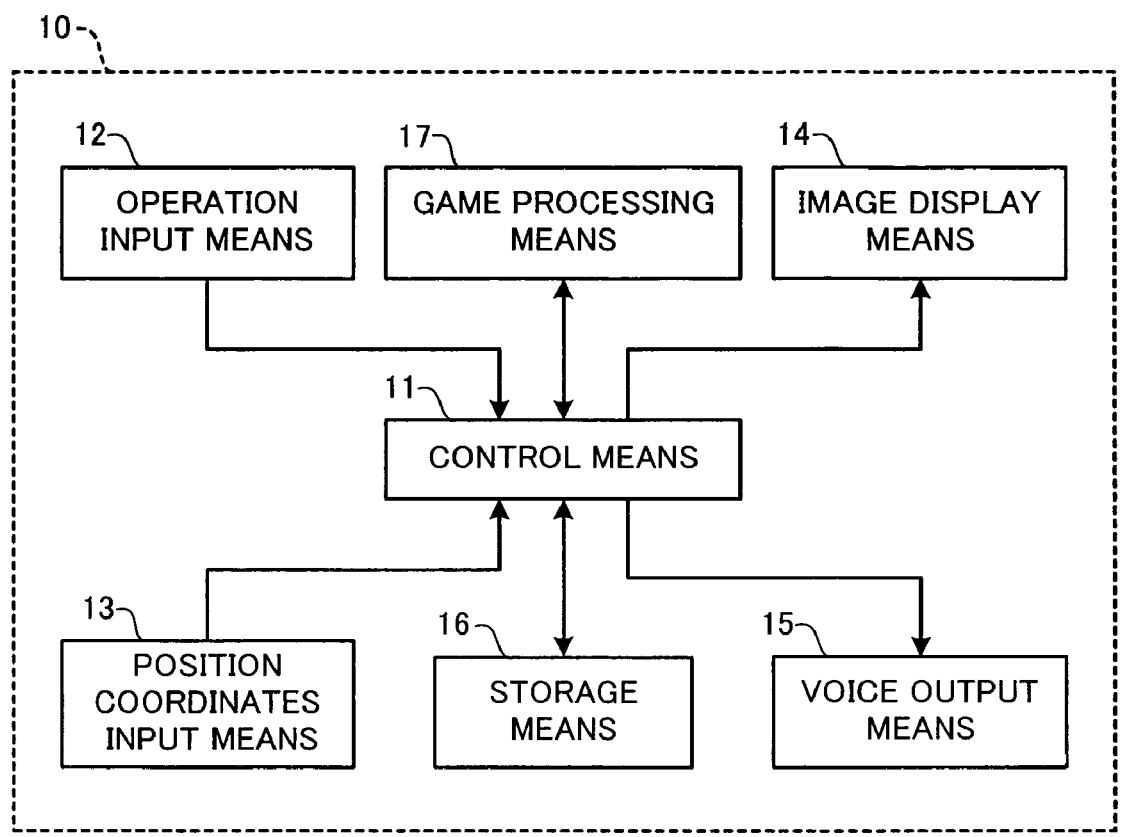

The present invention relates to a game device and program and, in particular, to a game device and program for performing a game in which, when a first-choice display object is chosen by a pointing operation using a coordinates input means such as a pointing device from among a large number of display objects displayed on a screen, a second-choice display object is then required to be determined as a correct choice.

BACKGROUND ART

Games in which a player chooses a specific display object from among a plurality of display objects displayed on a screen include a quiz game in which a correct choice is chosen from a plurality of choices and a find-the-mistakes game in which incorrect objects are determined from among a large number of objects able to be chosen from. It is usual that in these games both correct and incorrect choices are fixed and their display forms allow display objects to be displayed within a predetermined choice frame or to be arranged and displayed at predetermined positions. In such games it is considered unlikely that operability becomes a problem when coordinates on a screen are designated by a player using, for example, a pointing device.

Meanwhile, in a game in which the first choice can be chosen from any display object, and a correct/incorrect choice is determined by a second choice, such as a game in which a pair (for example, two display objects of the same type) is located from a large number of display objects, it has been revealed that when the second choice is chosen after the first, and the choice is freely taken, a player gains a different impression from cases in which the result of the second choice is correct or incorrect. It is considered that this difference in impression is caused when errors in choice caused by errors in the hardware or a sensory discrepancy of a player occurs, and this difference is, in particular, caused when display objects are arranged close together, or when display objects move individually. In other words, since the first choice can be made from any object, any problem associated with the choice of a correct/incorrect choice does not arise, but when the second choice is made, and it is determined to be incorrect even though the player intended to point to a correct display object, or it is determined to be correct, even though the player pointed to an incorrect display object by mistake, it raises the possibility of giving the player an unpleasant impression, even though the game device actually made a determination correctly.

SUMMARY OF INVENTION

[Technical Problem]

The present invention has been developed in view of the above-described circumstances, and it is an object of the present invention to provide a game device and program which can, when a player chooses a desired display object from among a large number of display objects via coordinate designation, reduce any unpleasant feelings felt by the player regarding their use of the pointing operation and improve the player's impressions about the feel of operation.

[Solution to Problem]

The present invention relates to a game device and program, and for the game device, the above-described object is achieved by a game device which includes display means for displaying a display object on a screen and input means for inputting position coordinates on the screen, wherein the game device performs a game in which, when a first-choice display object is freely chosen via a pointing operation undertaken by a player using the input means from among a large number of display objects displayed on the screen, a second-choice object is then required to be determined as a correct choice, comprising: storage means for storing an invisible choice determination range for determining whether or not the display object of interest has been chosen which corresponds to the display object of interest; determining means for performing determination processing for determining whether or not the display object of interest has been chosen via the pointing operation on the basis of the position coordinates from the input means and the choice determination range;
correct choice display object determining means for determining the second-choice object as a correct choice when the determining means has determined that the first-choice display object has been chosen; and correcting means for performing, when the second-choice object has been determined as a correct choice, correction processing for changing the size of a choice determination range for the display object of interest used for the determination processing so that the choice determination range for a correct choice display object becomes relatively larger than the choice determination range for an incorrect choice display object.

The above-described object is achieved more effectively by allowing the determining means to perform the determination processing using a choice determination range of the same size until the second-choice object is determined to be a correct choice, allowing the correcting means to perform, when changing the size of the choice determination range, correction processing for reducing the size of the choice determination range for the incorrect choice display object, allowing the correcting means to perform, when changing the size of the choice determination range, correction processing for increasing the size of the choice determination range for the correct choice display object, allowing the large number of display objects to be mobile objects which move at a predetermined speed in a predetermined direction in a virtual space, allowing the determining means to process, when it is determined that the correct second-choice object has been chosen, the next pointing operation by the player as the first choice, allowing the determining means to perform, when it is determined that the correct second-choice object has been chosen, processing for returning the size of the choice determination range corrected by the correcting means to a normal size, allowing the determining means to perform, when it is determined that the correct second-choice object has been chosen, processing for allowing the first-choice and second-choice display objects to disappear from the screen, allowing the determining means, when the choice determination ranges for two or more display objects overlap each other, to determine a display object positioned closest to the determining means on the basis of the position coordinates of the display objects in the virtual space and perform the determination processing using the choice determination range for the display object, and allowing the large number of display objects to consist of an object group comprising one or more groups of objects, wherein two or more objects, which belong to the same group constitute one group, and one or more dummy objects which do not belong to any group, and the correct choice display object determining means determines, when the correct second-choice object is determined, each of all the two or more objects which belong to the same group to be the correct second-choice display object, respectively.

For the program, the object of the present invention is achieved by allowing the computer of an information processor which comprises display means for displaying a display object on a screen, input means for inputting position coordinates on the screen, and storage means, and has functions for performing a game in which, when a first-choice display object is freely chosen via a pointing operation by a player using the input means from among a large number of display objects displayed on the screen, a second-choice object is then required to be determined as a correct choice, and includes a program for performing: a process for performing determination processing for determining whether or not the display object of interest has been chosen via the pointing operation on the basis of the position coordinates from the input means and an invisible choice determination range stored in the storage means which corresponds to the object of interest; a process for determining the second-choice object as a correct choice when the determining means has determined that the first-choice display object has been chosen; and a process for performing, when the correct second-choice object has been determined, correction processing for changing the size of a choice determination range for the display object of interest used for the determination processing so that the choice determination range for a correct choice display object becomes relatively larger than the choice determination range for an incorrect choice display object.

[Advantageous Effects of Invention]

According to the present invention, in the processing of a game in which, when a first-choice display object is freely chosen via coordinates designated by a player, a second-choice object is then required to be determined as a correct choice, the size of a choice determination range used when determining whether or not the correct second-choice object has been chosen is changed. More specifically, correction processing is performed for changing the size of the choice determination range so that the choice determination range for a correct choice display object becomes relatively larger than the choice determination range for an incorrect choice display object.

Therefore, in the condition where there is no difference in choice (for example, in the first choice where a correct/incorrect choice is not determined), any object may be equally chosen, and in the condition where there is a difference in choice (for example, in the second choice), it becomes easier to choose a correct object, while it becomes harder to choose an incorrect object. As a result, a reduction in the effect of imparting an unpleasant feeling to a player regarding their choice of a display object selected via coordinates designated by a choice determining means is produced and the player's impressions about the feel of the pointing operation are improved.

BRIEF DESCRIPTION OF DRAWINGS (FIG. 1) A block diagram showing an example of one possible configuration of the information processing system in accordance with the present invention.

(FIG. 2) A functional block diagram showing an example of one possible configuration of the principal part of the game processing means in accordance with the present invention.

(FIG. 3) A diagram showing one example of a display screen of a find-the-pair game in accordance with the present invention.

(FIG. 4) A schematic diagram showing one example of choice determination ranges for display objects in accordance with the present invention.

(FIG. 5) A schematic diagram showing an example of choice determination ranges after being subjected to correction processing in accordance with the present invention.

(FIG. 6) A flowchart showing the entire flow of game processing in accordance with the present invention.

(FIG. 7) A flowchart illustrating correction processing on a choice determination range in accordance with the present invention.

(FIG. 8) A diagram showing another example of a find-the-pair game in accordance with the present invention.

DESCRIPTION OF EMBODIMENTS

Hereinafter, various embodiments of the present invention will be described in detail with reference to the drawings. A case will be described here as an example which is applied to a computer game in which the first choice can be to choose any object, and the second choice determines a correct/incorrect choice, and specifically, to a computer game in which when the first-choice object is freely chosen from among a plurality of display objects displayed on a screen via a pointing operation undertaken by an operator (hereinafter referred to as the "player"), the second-choice display object is then required to be determined as a correct choice, and the correct display object is located from among the large number of display objects (hereinafter referred to as the "find-the-pair game").

A device for realizing a method for correcting a choice determination range for a display object in accordance with the present invention and a device for executing a program in accordance with the present invention can include an information processor which can execute a computer program, such as a home gaming device, a personal computer, a cellular phone, or a commercial gaming device (such as an arcade machine), and hardware configurations for general use can be applied thereto.

FIG. 1 is a block diagram showing an example of one possible configuration of an information processing system 10 (hereinafter referred to as a "game device") in accordance with the present invention. The game device in accordance with the present invention comprises a control section 11 for performing the execution control of computer programs and the input/output control of peripheral devices through an input/output interface, operation input means 12 for inputting various types of information such as characters and symbols, position coordinates input means 13 for inputting position coordinates on a screen, image display means 14 for displaying images, voice output means 15 for outputting sound effects and voices, storage means 16 for storing game programs and data, and game processing means 17 for performing the processing of the computer games.

In terms of hardware, the control means 11 comprises a controller such as a CPU or MPU, the operation input means 12, which includes input devices for mainly inputting characters such as push button switches and a keyboard, the position coordinates input means 13, which includes an input device for mainly inputting position coordinates on a display screen such as a pointing device (including a mouse, a track ball, a track pad, or a touch panel or the like), the image display means 14, which includes a display device such as a liquid crystal display or a CRT, and the voice output means 15, which includes a voice output device such as a speaker. It should be appreciated, however, that the present invention is not limited by the type and number of these pieces of hardware.

In a device which is not provided with the position coordinates input means 13, a form may by employed which uses the operation input means 12 instead of the position coordinates input means 13; where the form includes, for example, displaying a predetermined mark such as a cursor which moves in response to the operation of the operation input means 12 on a screen and where the position designated by the movement operation of the mark is processed as the position coordinates on the display screen.

The storage means 16 is an information storage medium in which image processing programs and data in accordance with the present invention are stored, and there is no limit to its type and location, so long as it allows input-output control by a CPU. For example, a form may be employed in which a program stored in a storage medium on a network and a program on the game device are allowed to cooperate to perform computer-graphics-related processing and a form which reads from a predetermined storage medium (a removable external storage medium or internal storage medium) on the game device and performs processing singly on the game device may also be employed. The latter will be described herein.

The game processing means 17 in accordance with the present invention is realized by a computer program controlled by the control means 11, and the program is stored in a computer-readable storage medium. A form realizing part of the image processing functions is included in the present invention.

Figure 2:
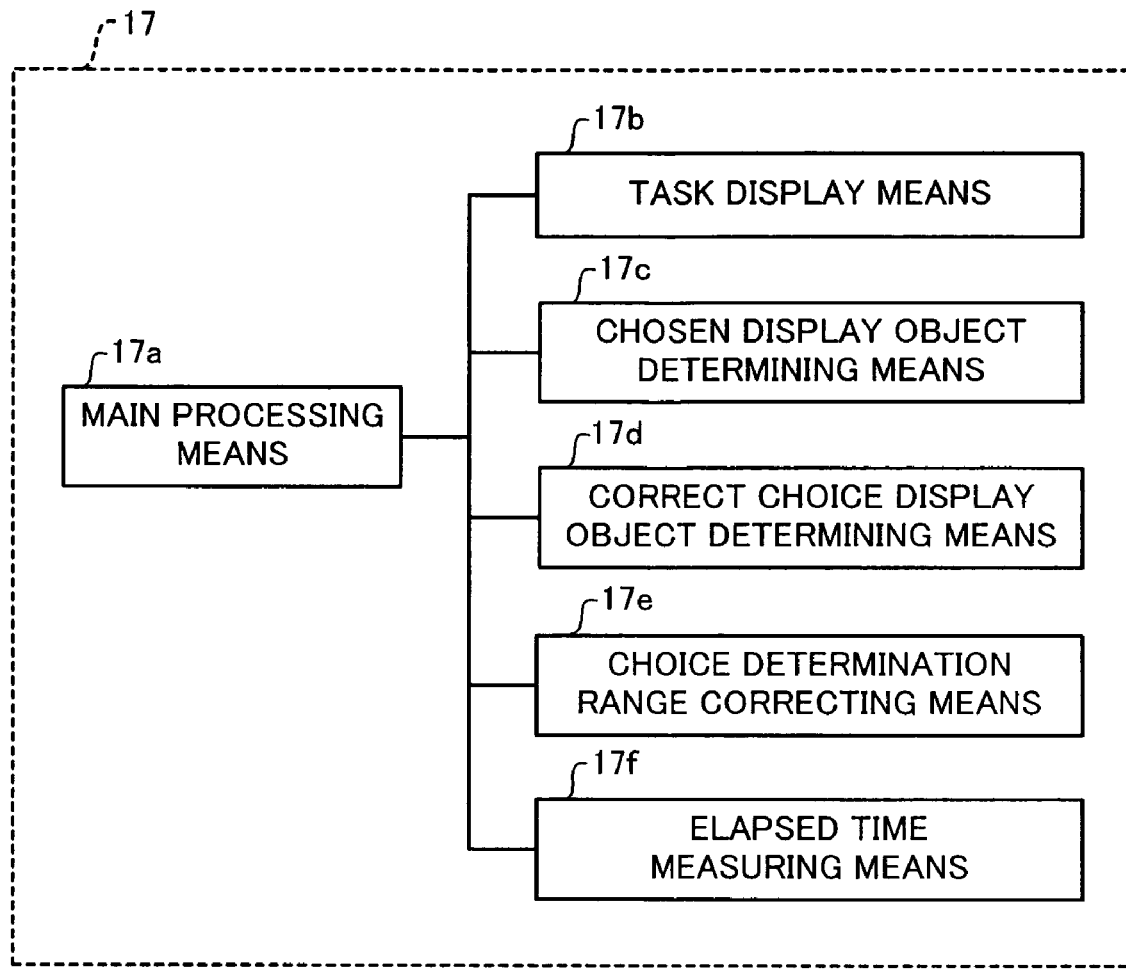

FIG. 2 is a functional block diagram showing an example of one possible configuration of the principal part of the game processing means 17 in accordance with the present invention. Means 17a to 17f shown in FIG. 2 are classified by function with the name of each means attached for convenience in the description, and it should be appreciated that these names are not intended to limit the scope of the software configuration in any way.

The processing of the means 17a to 17f shown in FIG. 2 will now be described.

The game processing means 17 mainly comprises a main processing means 17a, a task display means 17b, a chosen display object determining means 17c, a correct choice display object determining means 17d, a choice determination range correcting means 17e, and an elapsed time measuring means 17f.

The main processing means 17a controls the processing of the entire game including processing during standby and processing from the start to the end of a game.

The task display means 17b performs the processing for presenting a task of the above-described "find-the-pair game" to a player via a screen display (or voice output) and displaying a large number of display objects relative to the task on the screen of the image display means 14.

The chosen display object determining means 17c performs the processing for determining which display object has been chosen via a pointing operation undertaken by the player using the position coordinates input means 13 from among a large number of display objects displayed on the screen. In the present embodiment, the chosen display object determining means 17c determines that, using the position coordinates from the position coordinates input means 13 and the choice determination range corresponding to the display object of interest, the display object of interest corresponding to the choice determination range has been chosen, provided that the choice determination range including the position coordinates exists. When the display object is a moving object, the chosen display object determining means 17c determines, using the coordinate information of the choice determination range for the present position coordinates (the position coordinates of the display object when the position coordinates of a designated position are input from the position coordinates input means 13) of the display object on the screen and the coordinate information of the designated position (also from the position coordinates input means 13), whether the display object of interest has been chosen or not.

The size of the above-described choice determination range is not fixed, and the size of the choice determination range for the display object of interest can be changed by the choice determination range correcting means 17e, which will be described later.

The correct choice display object determining means 17d performs, when the first-choice object has been chosen, the processing for determining a second-choice display object as a correct choice on the basis of information representing the mutual relationship between the display objects (for example, attribute information representing categories to which the display objects belong).

The choice determination range correcting means 17e performs correction processing for changing the size of the chosen determination range for the display object of interest used for the determination processing by the above-described chosen display object determining means 17c. In the present embodiment, the choice determination range correcting means 17e performs the correction processing for changing the size of the chosen determination range of the display object of interest used for the determination processing using the chosen display object determining means 17c, when the second-choice object has been determined to be a correct choice by the correct choice display object determining means 17d, so that the choice determination range for the correct display object is relatively larger than the choice determination range for the incorrect display object.

The elapsed time measuring means 17f performs the processing to measure an elapsed period of time until the player clears (solves) all the tasks or clears (solves) one task presented by the task display means 17b. For example, in a game in which a time limit to clear a task is set, the main processing means 17a ends the game processing relative to the task when the elapsed time measured by the elapsed time measuring means 17f exceeds the time limit and presents the next task using the task display means 17b in order to start the game processing of the next task.

In the above-described configuration, a correction method for a choice determination range for a display object in accordance with the present invention will be described with reference to preferred embodiments.

First, in order to facilitate the understanding of the present invention, display objects displayed on a screen and a "find-the-pair" game in accordance with the present invention will be described.

Display objects displayed on the screen in the find-the-pair game may be still images, but may preferably be moving objects (moving objects automatically operated by the CPU operation) which move at a predetermined speed in a virtual space. Specifically, the above-described moving objects include characters imitating human figures, various kinds of animals, vehicles, or the like and characters which are less likely to move, such as figures, words, and plants. These display objects are classified in advance in a predetermined category (hereinafter referred to as a "group") such as by external appearance, color, and pattern or by biological type. Information on each display object is stored in the storage means in connection with a group ID (an identifier identifying the group) to which the display object of interest belongs.

The task display means 17b displays, for example, with two or more display objects belonging to the same group set to be one group, a plurality of display objects including one or more groups of display objects together with one or more display objects which do not belong to any group (dummy display objects) on the screen, and presents a task of a game to the player. The group and dummy display objects are preferably provided in a plurality of numbers in order to increase the number of variations of the game.

The find-the-pair game in accordance with the present invention will now be described with reference to preferred embodiments. The find-the-pair game in the present invention is, as described above, a game in which a player can choose any object as the first choice, and the second choice determines a correct/incorrect choice when a group constituting a pair is chosen via the pointing operation of the position coordinates input means 13 from among a large number of display objects. For example, when the player chooses a display object belonging to the same group as the first choice, the choice of another display object belonging to the group as the second choice will be a "correct choice," while the choice of a display object belonging to other group or a dummy object as the second choice will be an "incorrect choice." Meanwhile, when the player chooses a dummy object as the first choice, any object chosen as the second choice will be an "incorrect choice."

Figure 3:
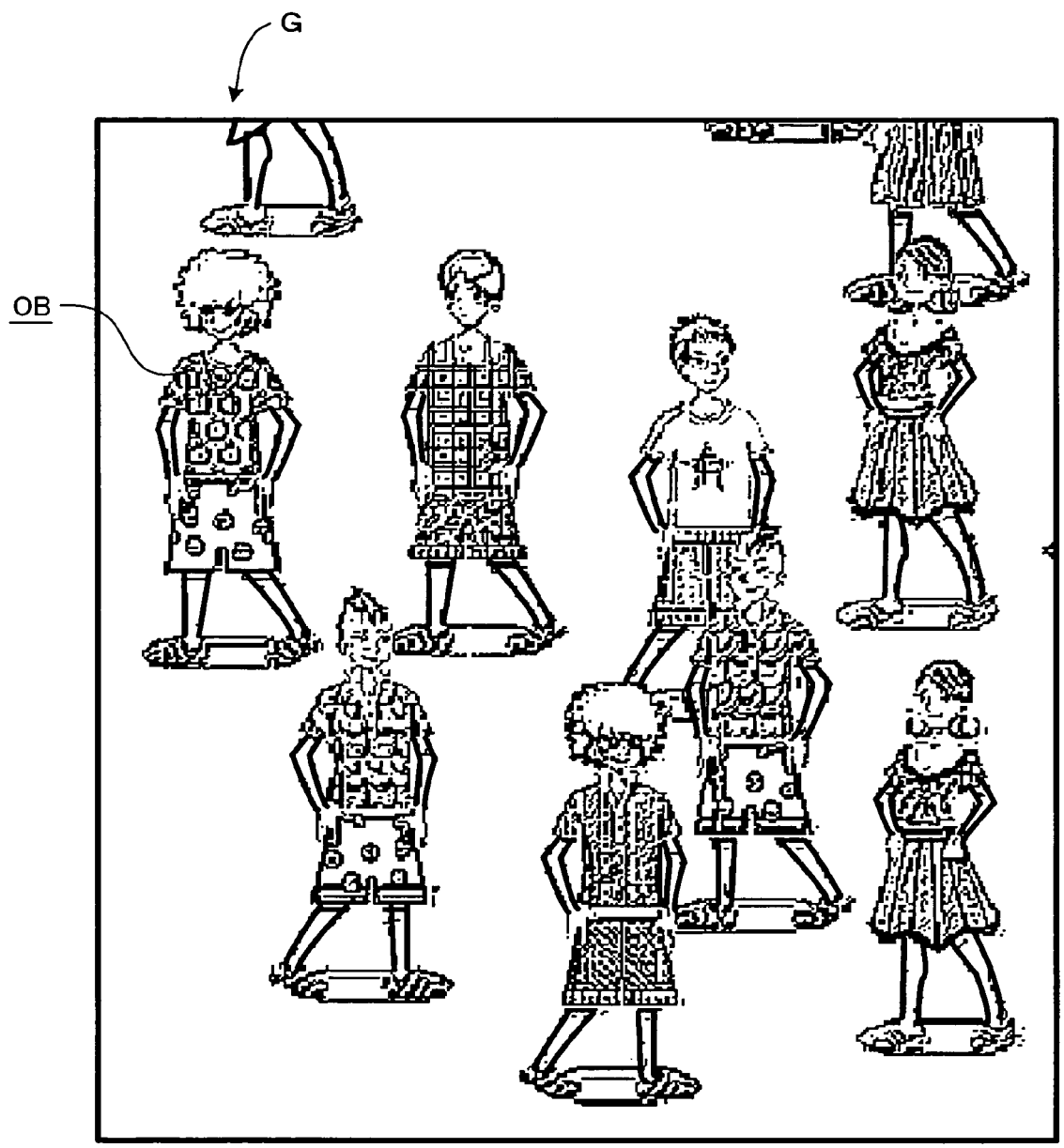

FIG. 3 shows an example of a display screen of the above-described find-the-pair game. The display object OB displayed on the display screen G is, in the present example, a display object imitating a human figure (hereinafter referred to as the "human figure object" or simply "human figure"). The human figure object OB is individually controlled in order to move at a predetermined speed in a predetermined direction in accordance with the operation of the CPU. The display objects OB are classified by group in advance; for example, group ID=1 is the same human figures: group ID=2 is human figures wearing the same clothes: and group ID=3 is human figures with the same hairstyle, allowing the human figures belonging to the same group (human figures of a particular kind) to be formed as three-dimensional objects or two-dimensional objects, which can be identified by their appearance.

A number of tasks are prepared for the find-the-pair game, and, for example, the following tasks are presented in succession every time a task is cleared. The word "pair" shown in the below-detailed tasks is replaced with a word obtained by combining one or more elements, which include, for example, "the same human figures," "human figures wearing the same clothes," "human figures with the same hairstyle," and "human figures wearing glasses." For example, for a task combining two elements, the "pair" may be (a) "the human figures wearing the same clothes" and "the human figures with the same hairstyle", (b) "human figures with the same hairstyle" and "human figures wearing glasses." In that case, when a form is employed in which human figures belonging to a plurality of groups are displayed, and a chosen, correct human figure is deleted (excluded from the choices) in order to continue the game, the number of correct choice changes in accordance with the order of choice, thereby increasing the number of variations and difficulty of the game.

<Examples of Tasks>

Task 1 "Finding two or more groups of pairs from 10 human figures on the screen."

Task 2 "Finding all groups of pairs from 13 human figures on the screen within a time limit."

Task 3 "Finding all groups in which three human figures of the same type as one group from 16 human figures on the screen."

Task 4 "Finding all groups in which two human figures constitute a pair from 20 human figures on the screen."

Next, taking a case applied to the above-described find-the-pair game as an example, data processing relating to a correction method for a choice determination range for a display object to be chosen (hereinafter referred to as the "object") will be described. Although the correction method for a choice determination range in accordance with the present invention is not limited by the type of the position coordinates input means 13, a case using a touch panel as the position coordinates input means 13 will be described as an example.

When determining whether or not the object of interest has been chosen via a pointing operation using the touch panel, it is preferred that, from the viewpoint of accuracy, the determination depends on whether or not a detected position on the screen designated by a finger of the player or a touch pen is within the shape area of the display object. In the determination method, however, as shown in the screen example in FIG. 3, a problem arises in which, when human figure objects OB to be chosen are close to each other or overlap each other on the screen, it is difficult to point to an intended human figure, and, although the player may have intended to point to one human figure, it is determined that the other human figure has been chosen.

So the present embodiment uses, as standard information for determining whether or not an object has been chosen, a choice determination range (a determination frame with a predetermined shape) with a size surrounding the entire object or at least the area of a characteristic part thereof. The choice determination range is a choice determination range invisible to the player, is not displayed on the screen and is used in internal processing. Information indicating the choice determination range (for example coordinate information indicating the determination frame) is stored in the storage means 16 in connection with the object of interest (for example, an object ID identifying the object or a group ID, which will be described later).

When the sizes of objects displayed on the screen are the same or nearly the same, the same standard choice determination range (the size of a normal choice determination range) is used. For example, in a game which displays objects with different sizes, a choice determination range specific to the object of interest is used, so that the choice determination range with a size in accordance with the size thereof is stored in the storage means 16 in connection with the object of interest.

An embodiment relating to a choice determination range will now be described.

Figure 4:
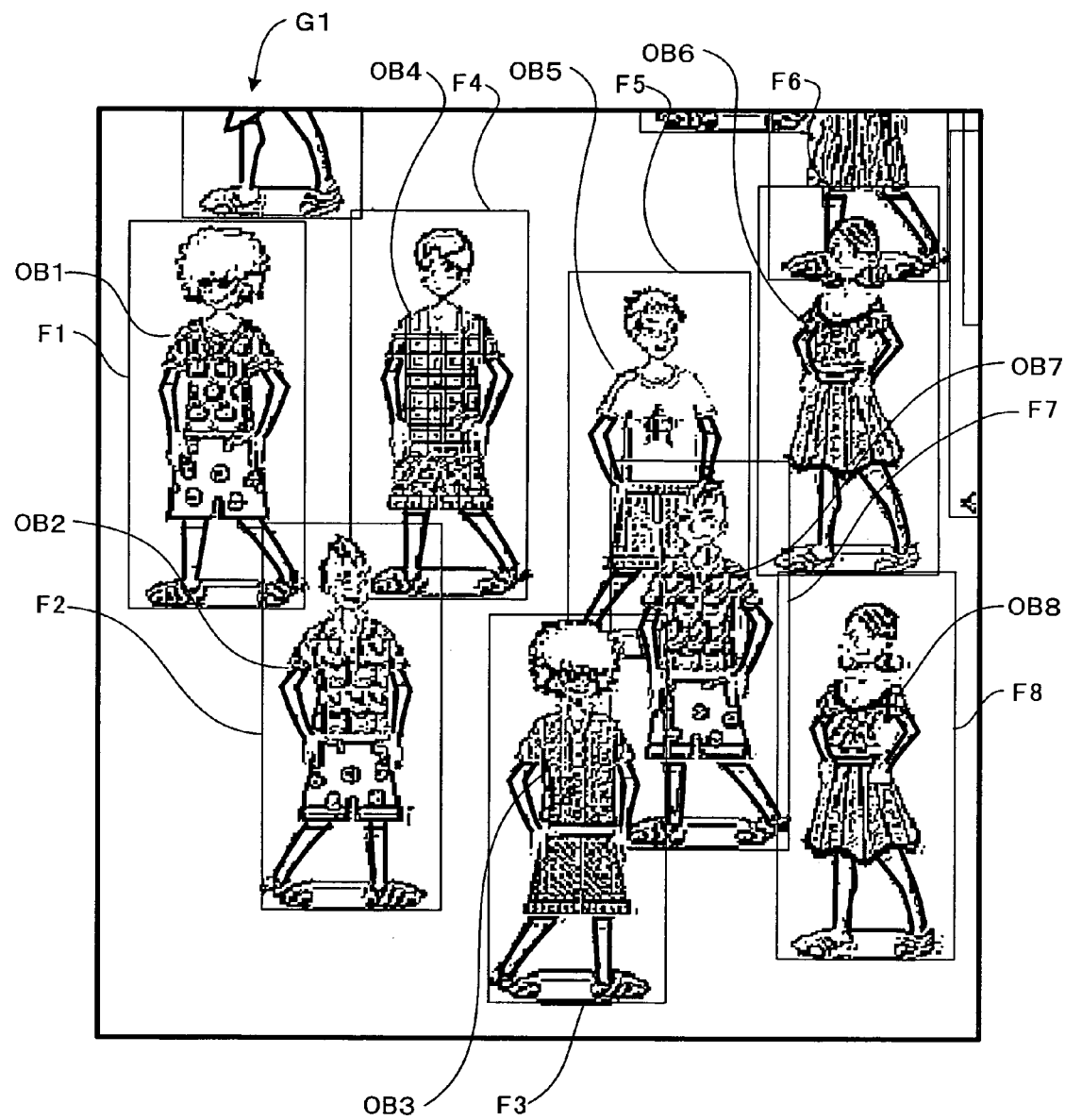

FIG. 4 is a schematic diagram showing an example of choice determination ranges for the human figure objects OB shown in FIG. 3. Choice determination ranges F (F1 to F8) for the human figure objects OB (OB1 to OB8) shown on the display screen G1 are pieces of information used by the chosen display object determining means 17c and are not displayed on the display screen.

The chosen display object determining means 17c determines whether or not the human figure object has been chosen by determining whether or not position coordinates on the screen G1 designated via a pointing operation using the touch panel are within the choice determination range F, and determines that the human figure object OB corresponding to the choice determination range F is the human figure chosen by the player.

In the present embodiment, the chosen display object determining means 17c, when performing the above-described determination processing, determines whether or not the object of interest has been chosen using the choice determination ranges F (F1 to F8) with the same size, as shown in FIG. 4., during the time until the first-choice object is chosen (that is, until the second-choice object is determined to be a correct choice) and determines, using a choice determination range after being corrected by the choice determination range correcting means 17e, whether or not the second-choice object has been chosen.

The choice determination range correcting means 17e, as described above, when, for example, the second-choice object is determined to be a correct choice by the correct choice display object determining means 17d, performs correction processing for changing the size of the choice determination range for the object of interest so that the choice determination range for the correct object becomes relatively larger than the choice determination range for an incorrect object.

The above-described correction processing includes, in the present embodiment, (M1) performing correction processing for changing the size of a choice determination range so that the choice determination range for the incorrect object becomes smaller than the size of the choice determination range which is used when determining whether or not the first-choice object has been chosen (the size of the normal choice determination range), or performing processing for changing the size of a choice determination range in accordance with a predetermined algorithm, such as by reducing a choice determination range with a predetermined scaling factor on the basis of a predetermined position such as the central position or the characteristic position of an object, (M2) performing correction processing for changing the size of a choice determination range in accordance with a predetermined algorithm so that the size of the choice determination range for the correct object becomes larger than the size of the normal choice determination range, and (c) performing correction processing for changing the size of a choice determination range so that the size of the choice determination range for the incorrect object becomes smaller and that the size of the choice determination range for the correct object becomes larger than the normal choice determination range.

Figure 5:
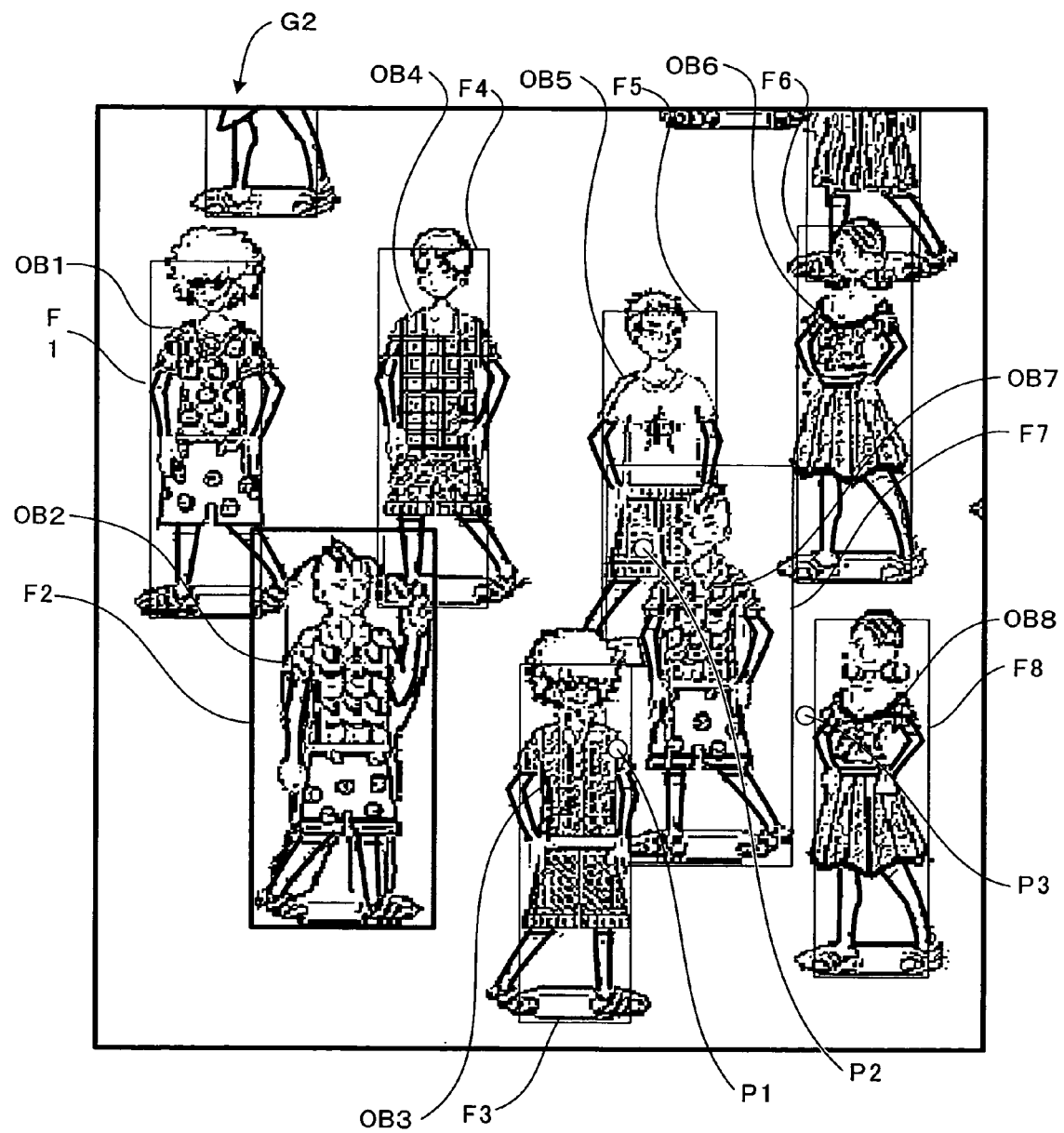

FIG. 5 is a schematic diagram showing an example of a choice determination range after being subjected to the above-described (M1) correction processing. The example in FIG. 5 shows a corrected example of a choice determination range when the human figure OB2 has been chosen as the first choice in the above-described Task 1 "Finding two or more groups of the same human figures." In FIG. 4, when the human figure OB2 has been chosen as the first choice, first, the human figure OB7 shown in FIG. 4 is determined to be the second-choice human figure (a correct human figure) to be chosen next by the correct choice display object determining means 17d. The choice determination range correcting means 17e performs correction processing on the human figures that will be incorrect choices when chosen by the player as the second choice (human figures other than the two human figures OB2, OB7 shown in FIG. 4 in the present embodiment) so that the choice determination ranges for them (F1, F3 to F6, and F8) are all reduced as shown in the example shown in FIG. 5. The chosen display object determining means 17c, when the position coordinates on the screen selected as the second choice is within the choice determination range OB7 for the correct human figure OB7, determines that the correct human figure has been chosen and at that time performs the next processing.

When the task has not been cleared (when a time limit is set, when the time limit has been reached and when the task has not been cleared), the next pointing operation undertaken by the player is processed as the first choice (for example, processing for returning an input counter from the position coordinates input means 13 to an initial value is performed) and performs processing for returning the size of the choice determination range corrected by the choice determination range correcting means 17e to the normal size. In addition, processing for allowing the first-choice human figure OB2 and the second-choice human figure to disappear from the display screen G2 is performed.

The chosen display object determining means 17c, when the choice determination ranges for two or more objects overlap each other, determines a human figure positioned closest to the determining means on the basis of the position coordinates of the human figures in the virtual space and performs determination processing using the choice determination range for the human figure. For example, when the position on the screen touched by the player is P1 shown in FIG. 5, it is determined that the human figure OB3 has been chosen using the choice determination range F3. Meanwhile, when that position is P2, it is determined that the human figure OB7 has been chosen using the choice determination range F7. When the position on the screen touched by the player is the position P3 shown in FIG. 5, it is determined that no human figure has been chosen.

By performing the above-described correction processing, in the condition where there is no difference in choice (for example, in the first choice in which a correct/incorrect choice is not determined), any object may be equally chosen, and in the condition where there is a difference in choice, it becomes easy to choose a correct object, while it is difficult to choose an incorrect object. As a result, the effect of increasing the circumstances in which a player feels advantaged and decreasing the circumstances in which the player feels disadvantaged, while maintaining the rules of the game, leads to the player's feelings associated with the pointing operation of the game being improved.

Next, an operating example of the game device 10 and the principal processing of the game processing means 17 will be described with reference to the flowcharts shown in FIGS. 6 and 7. Processing which has been already described will either be omitted or described in simple terms only.

First, the entire flow of the game processing in accordance with the present invention will be described using the flowchart shown in FIG. 6. In the present example, a case in which a time limit is not set for each individual task, but a time limit until all the tasks are cleared exists will be described as an example.

When the game processing means 17 is started by the control means 11 of the game device 10, the game processing means 17 first determines one task from among a plurality of tasks in the find-the-pair game, displays it on the screen, reads the image data of each object corresponding to the task from the storage means 16, generates the game image exemplified in FIG. 3, and displays it on the screen. When the game is started by displaying the first task, the measuring processing of the game time elapsed is started (Step S1).

Next, the game processing means 17 invokes a sub program for performing game processing for one pointing operation undertaken by the player, and performs the game processing for one pointing operation using the sub program (Step S2). When the game processing for one pointing operation ends, the game processing means 17 determines whether or not the task has been cleared (Step S3), and when it determines that the task has not been cleared, determines whether or not the time limit for the game has been reached (Step S4), and when it has been reached, the procedure returns to Step S2, and the game processing for the next pointing operation is performed.

Meanwhile, when it is determined that the task has been cleared in Step S3, the game processing means 17 determines whether or not all the tasks have been cleared (Step S5), and when some tasks remain, the procedure returns to Step S1, and the game processing for the next task is performed. When it is determined that the time limit for the game has been reached in Step S4, or when it is determined that all the tasks have been cleared in Step S5, game ending processing (predetermined processing such as score displaying) is performed to end the game.

Next, the game processing in the above-described Step S2 (the game processing for one pointing operation) will be described following the flow of the flowchart shown in FIG. 7.

Figure 6:
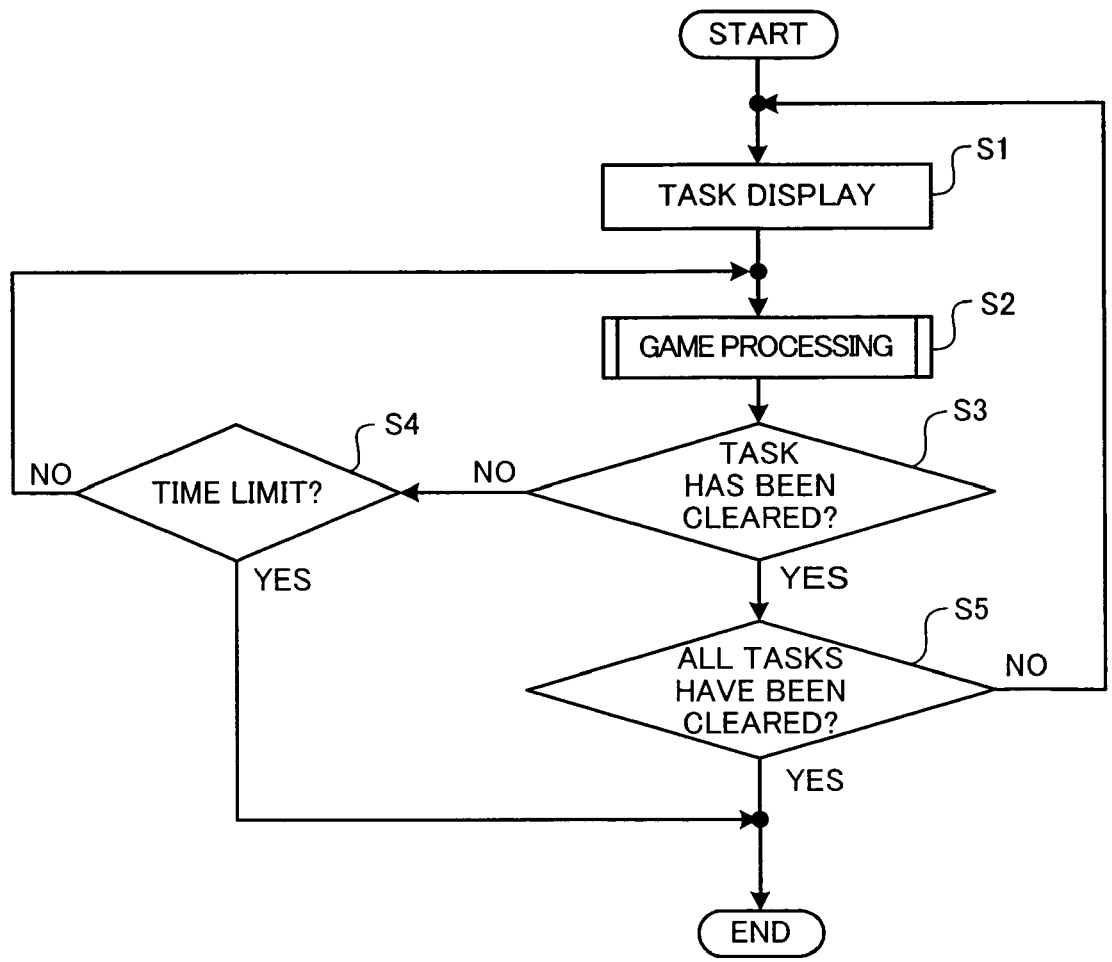

The game processing means 17 first inputs operation information from the touch panel and determines whether or not the operation information is the input of position coordinates for an object (Step S21), and when it determines that it is not the input of the position coordinates (when it is a pointing operation on an area other than the area associated with position coordinates, such as an elapsed time display area on the screen), it returns the procedure to Step S3, as shown in FIG. 6, in order to continue the main processing. Meanwhile, if it determines that it is the input of position coordinates, the game processing means 17 determines that a choice operation on an object has been performed by the player, refers to the input counter (the initial value=1) which indicates what choice the choice operation is, and determines whether or not it is the first-choice choice operation (Step S22).

When it determines that it is the first-choice choice operation, the game processing means 17 determines which object has been chosen using the position coordinates from the touch panel and the choice determination range (coordinates information of the standard choice determination range), stores the group ID to which the chosen object belongs (when it belongs to two or more groups, each group ID is stored) in the storage section, determines that the object which belongs to the same group ID as the above-described group ID is a correct choice object, and determines that others are incorrect choice objects. The game processing means 17 stores a correct choice determination ID indicating a correct/incorrect choice in the storage section along with a corresponding object ID identifying each object, and sets 2 in the input counter so that the next coordinates input are processed as the second choice (Step S23). The game processing means 17 then, as exemplified in FIG. 5, changes the size of the choice determination range of the incorrect choice objects (Step S24), and ends the game processing for the first-choice pointing operation (returns the procedure to Step S6 in FIG. 6).

Meanwhile, when it determines that it is not the first-choice choice operation in Step S22, the game processing means 17 refers to the input counter, determines whether or not it is the second-choice choice operation (Step S25), and when it determines that it is the second-choice choice operation (a choice operation on an object different from the first choice), determines which object has been chosen using the position coordinates from the touch panel and the choice determination range (coordinates information of the normal choice determination range). The game processing means 17 refers to the above-described correct choice determination ID corresponding to the object ID of the chosen object, determines whether or not the correct choice object has been chosen by the player (Step S26), and when it determines that the correct choice object has been chosen, performs predetermined correct choice processing such as output processing of a screen and sound effects indicating the correct choice, score adding processing, image processing allowing the first-choice and second-choice objects to disappear from the screen, and processing for setting 1 in the input counter so that the next coordinates input are processed as the first choice (Step S27).

The game processing means 17 then returns the choice determination ranges (or the choice determination ranges after being subjected to size correction) of all the objects to normal (Step S28), and ends the game processing for the pointing operation (returns the procedure to Step S3, as shown in FIG. 6).

For a game form in which the player is allowed to continue choice operations until the correct choice object corresponding to the first-choice object is chosen, the input counter remains as 2 so that the next coordinates input are processed as the second choice in Step S27, and the game processing for the second-choice pointing operation ends.

Meanwhile, when the game processing means 17 determines that the correct choice object has not been chosen in Step S26, it performs predetermined incorrect choice processing such as the output processing of a screen and sound effects indicating the incorrect choice, score subtracting processing, and processing for setting 1 in the input counter so that the next coordinates input are processed as the first choice (Step S29), and moves the procedure to the above-described Step S28.

When the game processing means 17 determines that it is not the second-choice choice operation in Step S25, it determines whether or not the same object as the first choice has been chosen (Step S30), and when it determines that the same object has been chosen, determines that it is an operation for canceling the first choice, and performs predetermined choice canceling processing such as processing for deleting the display indicating the object chosen as the first choice (for example, image display providing the periphery of the outline of an object with a specific color), and processing for setting 1 in the input counter so that the next coordinates input ate processed as the first choice (Step S31), and moves the procedure to the above-described Step S28.

Meanwhile, when it determines that it is not the choice of the same object as the first choice (for example, when it is a pointing operation outside of each choice determination range) in Step S30, the game processing means 17 returns the procedure to Step S3, as shown in FIG. 6, in order to continue the main processing.

When a plurality of correct choice objects are provided, a processing form may be employed in which the input counter remains as 2 so that the next coordinates input are processed as the second choice until all the correct choice objects are chosen in Step S27.

<Other Embodiments>

Figure 7:
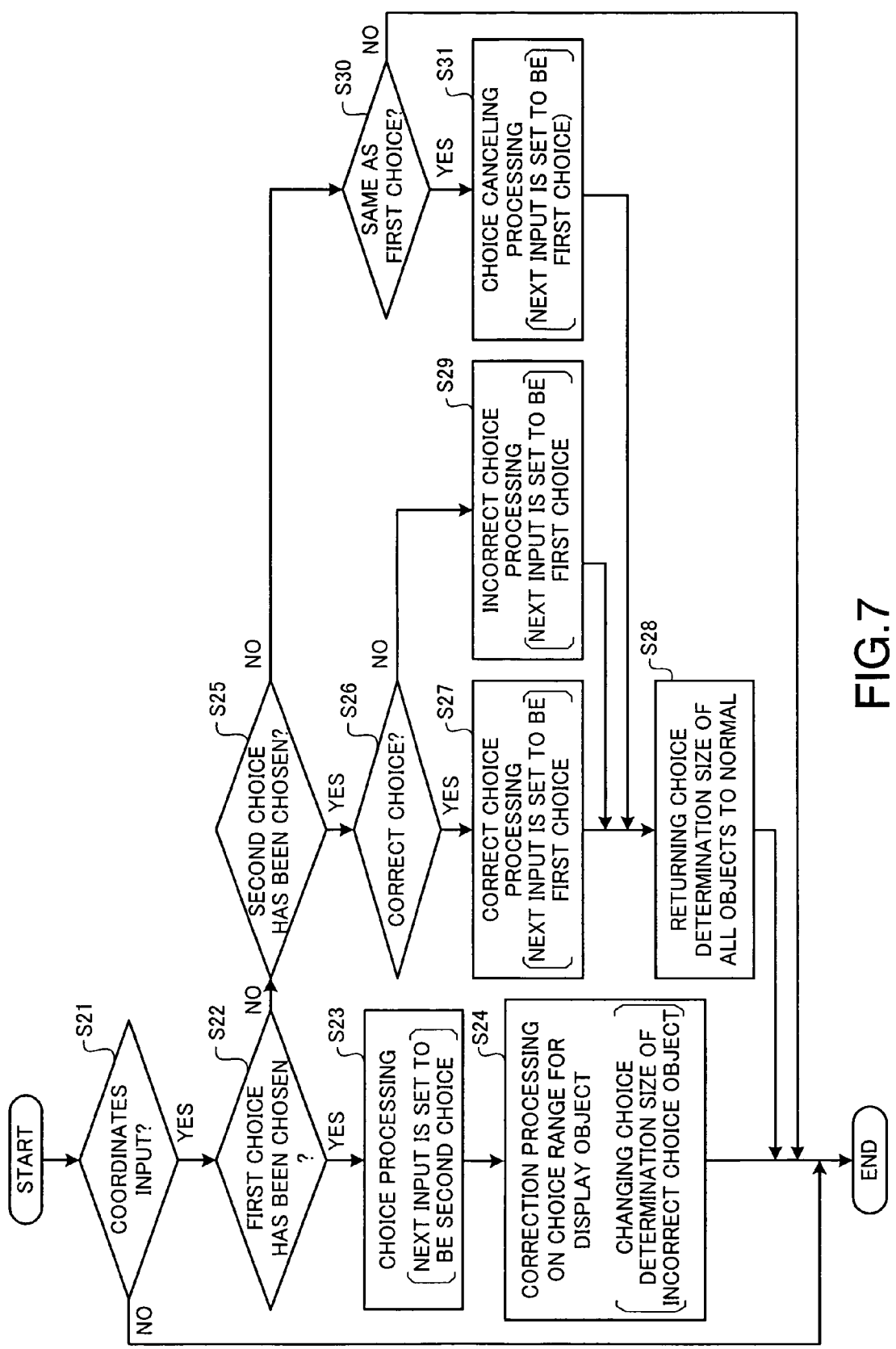

In the processing of Step S24 in the flowchart shown in FIG. 7 and the example shown in FIG. 5, an example of correction processing on the choice determination range for an object was described regarding a case for changing the size of the choice determination range of the incorrect choice object. It should, however, be appreciated that the above-described (M2) or (M3) correction processing may be performed instead.

In the example shown in FIG. 4 and FIG. 5, a case in which a rectangular choice determination range (a rectangular choice determination range having sides in the X-axis and Y-axis directions) was used from the viewpoint of enhancing determination processing speed and the like. It should, however, be appreciated that a circular, convex, or concave choice determination range may instead be used, and the rectangular example used is provided by way of example only and is not intended to be limiting in any way.

Although a case in which, when the choice determination ranges of objects overlap each other, the choice determination processing is performed using the choice determination range for the object positioned closest to the determining means was described as an example, when the choice determination ranges of the correct choice object and the incorrect choice object overlap each other, choice determination processing may be performed using the choice determination range for the correct choice object preferentially, regardless of their positional relationship, or whether the incorrect choice is close to the determining means or not.

Figure 8A:
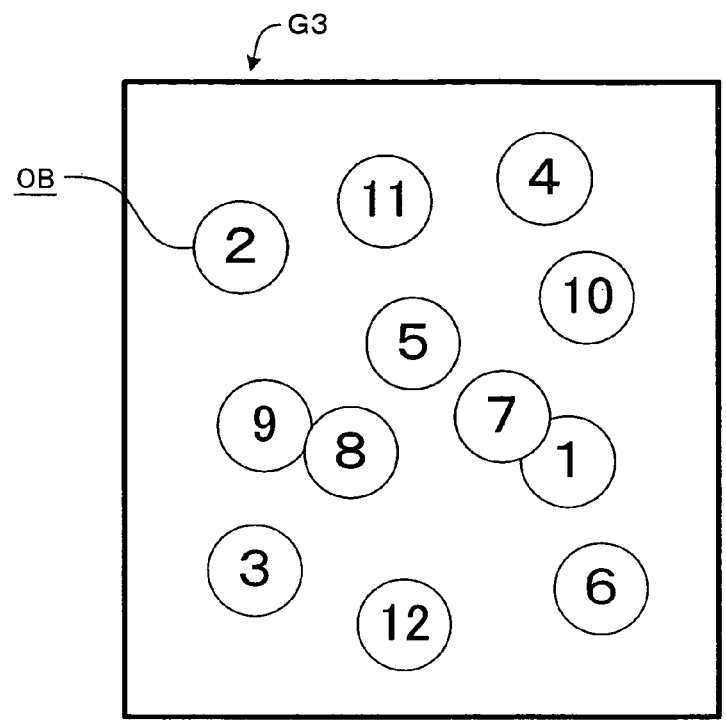

As an example of the find-the-pair game, although the case in which a plurality of human figure objects including the same human figures are displayed was described as an example, as shown in FIG. 8(A), a game form may be employed in which successive figures starting from 1 are randomly arranged as objects OB on a display screen G3, and the figures are successively chosen in ascending order from 1. In this case, when 1 is chosen, 2 is determined to be a correct choice object, and the correction processing on the choice determination range is performed. When the second choice is then chosen, processing for returning the choice determination sizes of all the objects to normal is performed, and the next input is processed as the first choice. Hereinafter in the example shown in FIG. 8(A), for successive, adjacent figures such as "3→4" and "4→5" as a pair, respectively, the same processing is repeated up to object 12.

Figure 8B:
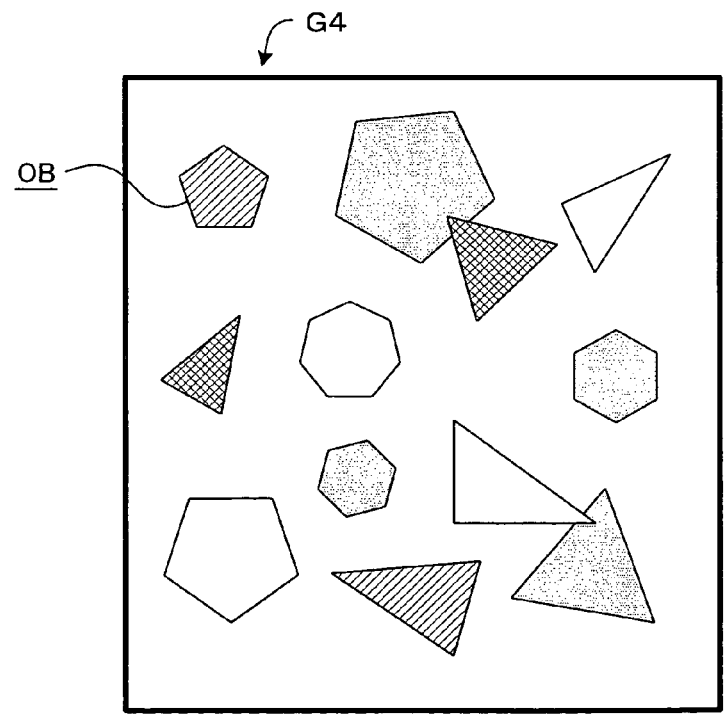

As shown in FIG. 8(B), a game form may be employed in which objects having the same shape (and the same pattern) and different sizes and directions may be displayed on a display screen G4 as objects OB, and the objects OB having the same shape or same pattern are chosen. In this case, a choice determination range which is used normally is set for each object in accordance with, for example, the shape and size of the object, and correction processing for enlarging or reducing its choice determination range is performed.

While the present invention is preferably applied to a game in which when the first-choice object is chosen, the second-choice object to be chosen is determined next, it can be applied to various games, other than the above-described game, such as a word-chain game in which fruits, animals, or the like are displayed as objects, where another object which begins with the ending of a name is chosen one after another, or a game in which various kinds of creatures (dogs, cats, birds, reptiles, crustaceans, insects, fishes, or the like) are displayed as objects, and a plurality groups of the same kind of objects are chosen.

[Reference Signs List]
G1, G2 Game image
OB Display object
F1 to F8 Choice determination ranges
10 Game device
11 Control means
12 Operation input means
13 Position coordinates input means
14 Image display means
15 Voice output means
16 Storage means
17 Game processing means
17a Main processing means
17b Task display means
17c Chosen display object determining means
17d Correct choice display object determining means
17e Choice determination range correcting means
17f Elapsed time measuring means

The invention claimed is:

1. A game device for performing a game, the game device comprising:
    display means for displaying one or more display objects of a plurality of display objects on a screen;
    input means for inputting position coordinates on the screen and for choosing, via a pointing operation performed by player using said input means, a display object from among a plurality of play objects displayed on the screen, such that, when a first-choice display object is chosen (i) via the pointing operation performed by the player using said input means and (ii) from among the plurality of display objects displayed on the screen, a second-choice display object of the plurality of display objects is determined as a correct choice;
    storage means for storing invisible choice determination ranges, each invisible choice determination range of the invisible choice determination ranges corresponding to a respective display object of the plurality of display objects, the invisible choice determination ranges being used for determining, based on the invisible choice determination range corresponding to a display object of interest of the plurality of display objects, whether or not the display object of interest has been chosen;
    determining means for performing determination processing for determining whether or not the display object of interest has been chosen via the pointing operation performed by the player, the determination processing being performed based on the position coordinates input from said input means and the invisible choice determination ranges;
    correct choice display object determining means for determining that the second-choice display object is the correct choice when said determining means determines that the first-choice display object has been chosen; and
    correcting means for performing, when the second-choice display object is determined to be the correct choice, correction processing for changing a size of the invisible choice determination range corresponding to the display object of interest, such that the invisible choice determination range corresponding to the second-choice display object determined to be the correct choice becomes relatively larger than the invisible choice determination range corresponding to a display object of the plurality of display objects that is an incorrect choice.

2. The game device according to claim 1, wherein said determining means performs the determination processing, such that the invisible choice determination ranges corresponding to the respective display objects are of a same size until the second-choice display object is determined to be the correct choice.

3. The game device according to claim 1 or claim 2, wherein said correcting means performs, when changing the size of the invisible choice determination range corresponding to the object of interest, correction processing for reducing the size of the invisible choice determination range corresponding to the display object that is the incorrect choice.

4. The game device according to claim 1, wherein said correcting means performs, when changing the size of the invisible choice determination range corresponding to the object of interest, correction processing for increasing the size of the invisible choice determination range corresponding to the second-choice display object that is the correct choice.

5. The game device according to claim 1, wherein each display object of the plurality of display objects is a mobile object moving at a predetermined speed in a predetermined direction in a virtual space.

6. The game device according to claim 1, wherein said determining means processes, when the second-choice display object, which is the correct choice, is chosen, a next pointing operation performed by the player choosing the first-choice display object.

7. The game device according to claim 6, wherein said determining means performs, when the second-choice display object, which is the correct choice, is chosen, processing for returning the size of the invisible choice determination range corrected by said correcting means to a normal size.

8. The game device according to claim 6, wherein said determining means performs, when the second-choice display object, which is the correct choice, is chosen processing for allowing the first-choice display object and the second-choice display object to disappear from the screen.

9. The game device according to claim 1, wherein, when the invisible choice determination ranges corresponding to two or more display objects of the plurality of display objects overlap, said determining means determines, from among the plurality of display objects, a display object positioned closest to said determining means based on the position coordinates of display objects, of the plurality of display objects, located in a virtual space and performs the determination processing using the invisible choice determination range corresponding to the display object determined to be positioned closest to said determining means.

10. The game device according to claim 1,
wherein the plurality of display objects consists of an object group including one or more groups of objects,
wherein two or more display objects, of the plurality of display objects, which belong to a same group constitute one group,
wherein one or more dummy display objects, of the plurality of display objects, do not belong to any group, and
wherein said correct choice display object determining means determines that, when the second-choice display object is determined to be the correct choice, each of the two or more objects belonging to the same group is the second-choice display object which is the correct choice.

11. A non-transitory computer-readable recording medium having a program recorded thereon, the program for being executed by a computer of an information processor for performing a game, the information processor comprising display means for displaying one or more display objects of a plurality of display objects on a screen, input means for inputting position coordinates on the screen and for choosing, via a pointing operation performed by a player using the input means, a display object from among a plurality of display objects displayed on the screen, such that, when a first-choice display object is chosen (i) via the pointing operation performed by the player using the input means and (ii) from among the plurality display objects displayed on the screen, a second-choice display object of the plurality of display objects is determined as a correct choice, and storage means storing invisible choice determination ranges, each invisible choice determination range of the invisible choice determination ranges corresponding to a respective display object of the plurality of display objects, the invisible choice determination ranges being used for determining, based on the invisible choice determination range corresponding to a display object of interest of the plurality of display objects, whether or not the display object of interest has been chosen, the program causing the computer to execute a method comprising:

performing determination processing for determining whether or not the display object of interest has been chosen via the pointing operation performed by the player, the determination processing being performed based on the position coordinates input from the input means and the invisible choice determination ranges stored in the storage means;

determining that the second-choice display object is the correct choice when said performing of the determination processing determines that the first-choice display object has been chosen; and performing, when the second-choice display object is determined to be the correct choice, correction processing for changing a size of the invisible choice determination range corresponding to the display object of interest, such that the invisible choice determination range corresponding to the second-choice display object determined to be the correct choice becomes relatively larger than the invisible choice determination range corresponding to a display object of the plurality of display objects that is an incorrect choice.

* * * * *